Oct. 30, 1945.  R. S. SANFORD ET AL  2,388,088
GEAR SHIFTING MECHANISM
Original Filed Oct. 28, 1937  4 Sheets-Sheet 1

Inventors
Roy S. Sanford
William J. Andres
By
N. D. Parker jr.
Attorney

Oct. 30, 1945.  R. S. SANFORD ET AL  2,388,088
GEAR SHIFTING MECHANISM
Original Filed Oct. 28, 1937   4 Sheets-Sheet 2
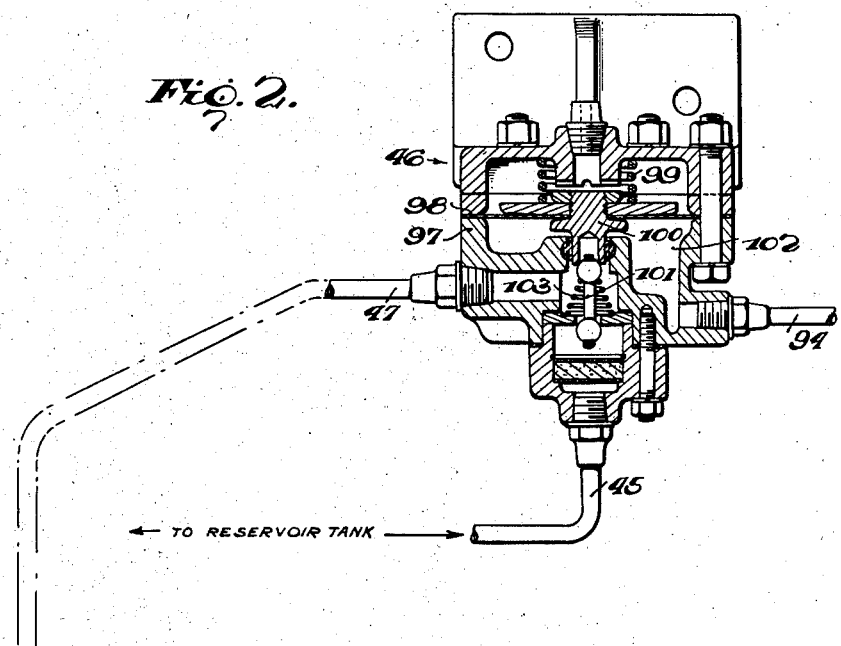
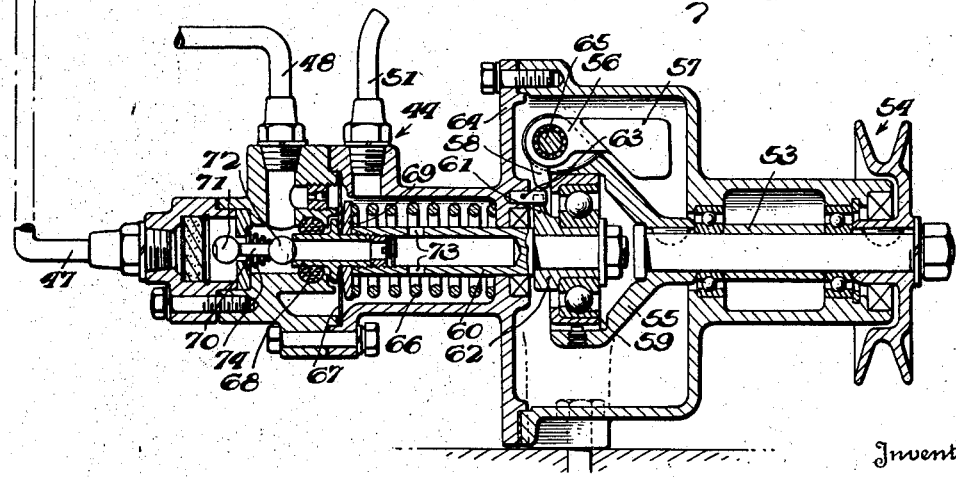
Inventors
Roy S. Sanford
William J. Andres
By N. D. Parker Jr.
Attorney

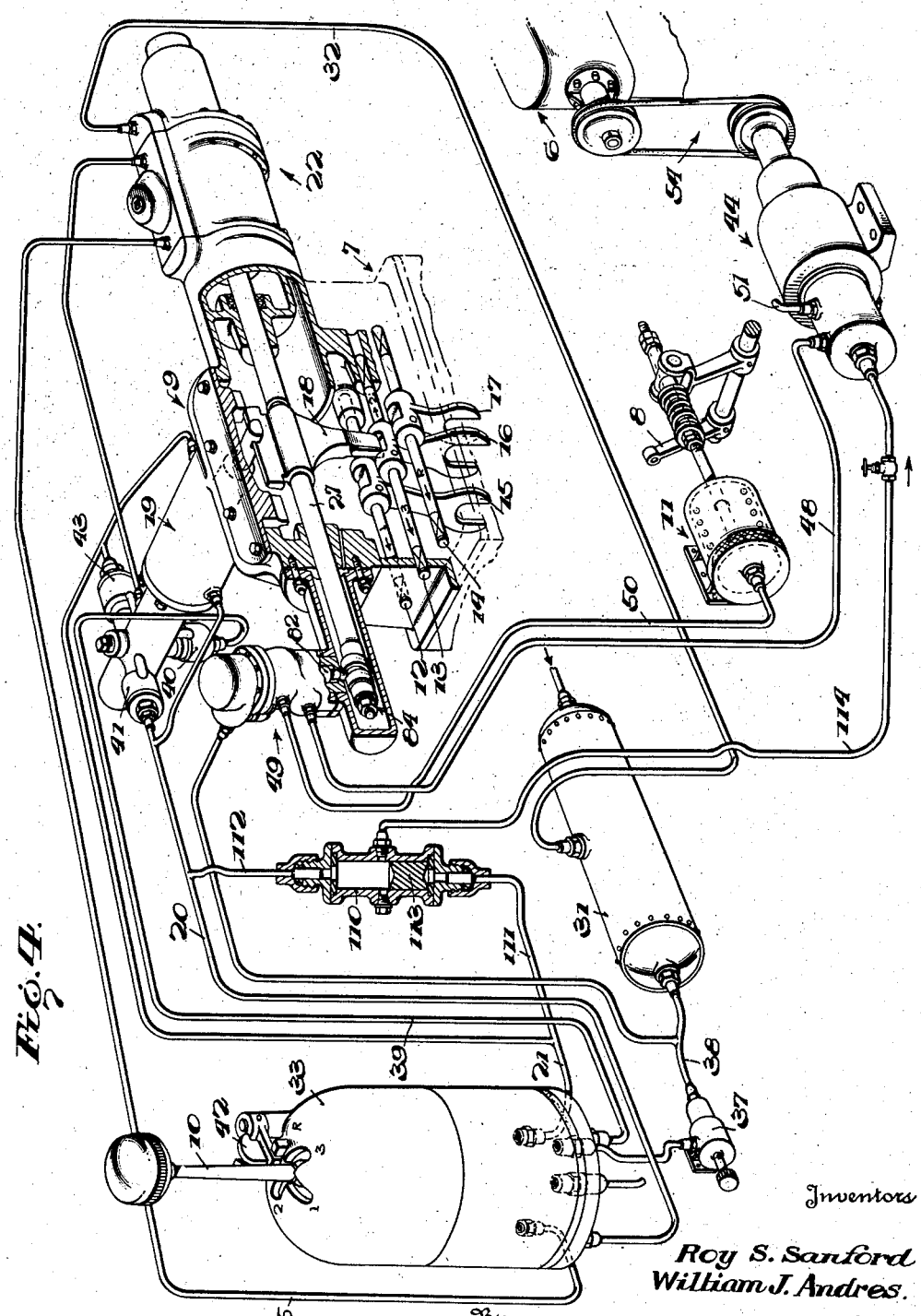

Patented Oct. 30, 1945

2,388,088

UNITED STATES PATENT OFFICE 2,388,088

GEAR SHIFTING MECHANISM

Roy S. Sanford and William J. Andres, Pittsburgh, Pa., assignors to Bendix-Westinghouse Automotive Air Brake Company, Pittsburgh, Pa., a corporation of Delaware Application October 28, 1937, Serial No. 171,567
Renewed November 18, 1939

33 Claims. (Cl. 192—3.5)

This invention relates to a controlling mechanism for automotive vehicles and more particularly to a mechanism for controlling the operation of the vehicle clutch and ratio-changing transmission.

It has heretofore been proposed to employ, in connection with fluid-operated motor vehicle clutches, a centrifugally-operable valve mechanism for controlling the flow of fluid to and from the clutch motor whereby, when the vehicle engine is idling, the clutch is disengaged, and, as the engine speed is increased, the clutch is gradually and smoothly engaged. In such prior arrangements, however, it has been found that, when the vehicle is proceeding forwardly with the transmission established in intermediate or high gear ratio, it often happens that the engine speed drops to such an extent as to partially operate the centrifugally-operable valve mechanism controlled thereby. Under these conditions, it has been found in practice that the power device for controlling the vehicle clutch becomes partially energized, thereby causing a partial disengagement of the vehicle clutch. This action causes slippage between the clutch plates with consequent rapid wear of the parts. The above operation is highly undesirable when proceeding in high gear, for example, upgrade, when the vehicle engine is under heavy load and the speed thereof has consequently dropped to that indicated above, not only because of the slippage of the clutch but also because it necessitates a shift of the transmission to a lower gear ratio in order to proceed.

It is accordingly one of the objects of the present invention to provide a transmission and clutch-controlling mechanism which shall be so constituted as to avoid the above disadvantages.

Another object is to provide a novel mechanism for varying the ratio of a motor vehicle transmission and coordinately operating the vehicle clutch through the instrumentality of a single control member thereby greatly simplifying the operation of motor vehicles.

Still another object is to provide, in a motor vehicle control mechanism, a novel mechanism for controlling the vehicle clutch in accordance with variations in the engine speed so that engaging and disengaging operations of the clutch may be readily controlled through manipulation of the accelerator pedal.

Another object is to combine a clutch-controlling mechanism of the foregoing character with a power-operated gear-shifting mechanism in such a manner that, by operating the control member of the latter, the operation of the clutch and shifting of gears may be effected in an automatic and coordinated manner.

A further object comprehends the arrangement of a gear-shifting and clutch-controlling mechanism of the above type in such fashion that slippage of the clutch will be avoided.

A still further object resides in the provision of a construction for shifting the transmission gears by power together with a mechanism for controlling the vehicle clutch in accordance with changes in engine speed, the apparatus being so constituted that the clutch is automatically disengaged by operation of the transmission when shifting into intermediate or high gear positions, but is controlled by the engine-operated clutch control mechanism when other gear ratios are established, such an arrangement avoiding slippage and excessive wear of the clutch.

Other objects and novel features of the invention will appear more fully hereinafter from the following detailed description when taken in connection with the accompanying drawings illustrating several embodiments of the invention. It is to be expressly understood, however, that the drawings are employed for purposes of illustration only and are not designed as a definition of the limits of the invention, reference being had for this purpose to the appended claims.

Referring to the drawings, wherein similar reference characters refer to similar parts throughout the several views:

Fig. 2 is a sectional view of one of the valvular mechanisms utilized in the system disclosed in Fig. 1;

Fig. 3 is an axial sectional view of the centrifugally-controlled valve mechanism employed in Fig. 1;

Fig. 4 is a diagrammatic view, partly in section, illustrating a modified form of vehicle-controlling mechanism.

Figure 1:
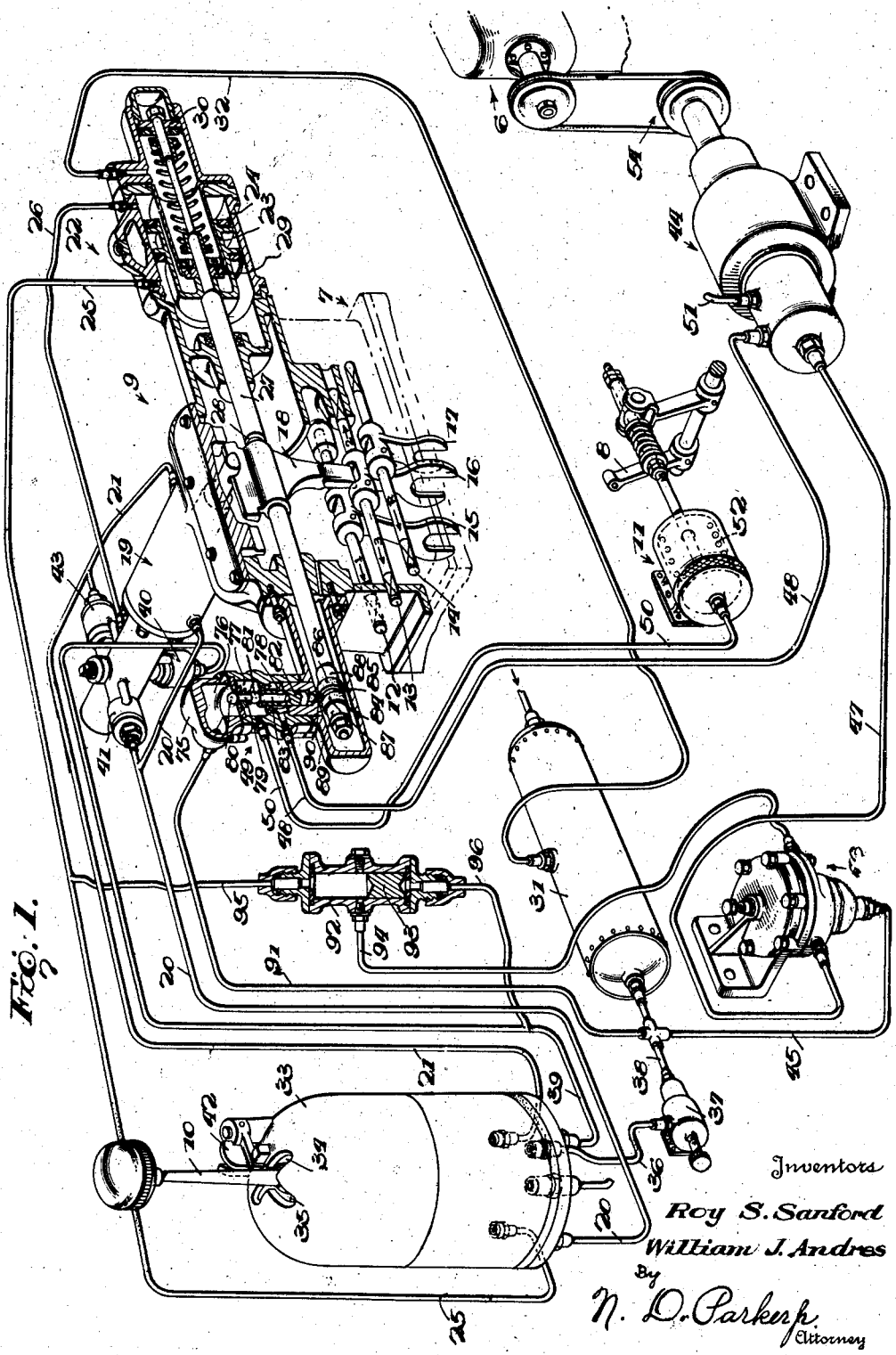
Fig. 1 is a diagrammatic view, partly in section, of an automotive vehicle control mechanism constructed in accordance with the principles of the present invention.

Referring more particularly to Fig. 1, the present invention is illustrated therein in connection with an automotive vehicle having an engine 6, a ratio-changing transmission 7 and a clutch-controlling member 8. The transmission 7 has associated therewith any suitable fluid pressure-operated gear-shifting mechanism 9 adapted to be controlled from a remote position through manipulation of a manually-operable lever 10, while the clutch-controlling member 8 is adapted to be operated by a fluid motor 11, the construction being such that, during the operation of the gear-shifting mechanism, the clutch-controlling member 8 will be automatically controlled to the end that the automotive vehicle clutch may be efficiently engaged and disengaged in proper sequence with changes in the transmission gear ratio.

Although any suitable power-operated apparatus 9 may be employed for effecting changes in the gear ratio of the transmission 7, it is preferred to utilize an apparatus constructed in accordance with the application of Roy S. Sanford, Serial No. 57,410, filed January 3, 1936, for Gear shifting mechanism. Such apparatus, as illustrated herein, is associated with a transmission of the type having three shift rails 12, 13 and 14 for shifting the transmission gears through shifter forks 15, 16 and 17 respectively secured thereto. The shift rails 12 and 14, when moved to the left, as viewed in Fig. 1, respectively establish first and reverse gear ratios while corresponding movement of the shift rail 13 effects third gear ratio and opposite movement thereof serves to establish the second gear relation. As shown, a combined selector and shifter finger 18 is adapted to cooperate with the shifter forks in order to select and shift the desired shift rail, the said finger being oscillatable to effect the aforesaid selecting movement by means of a fluid actuator 19 to which fluid pressure is admitted through conduits 20 and 21. The shifting of the finger 18 and selected shift rail engaged thereby is accomplished by a shifting actuator 22 which includes a piston 23 housed within a cylinder 24, the latter being supplied with fluid pressure through conduits 25 and 26. The piston 23 is operatively connected to a piston rod 27 having a lost motion connection 28 with the shifter finger 18, such lost motion connection being provided for a purpose which will appear more fully hereinafter. Preferably, a pair of neutralizing pistons 29 and 30 are associated with the piston 23 and piston rod 27 and are subject at all times to fluid pressure from reservoir 31 through conduit 32, the construction being such that, upon exhaust of fluid pressure from cylinder 24, the neutralizing pistons will be effective to return the piston 23 and finger 18 to neutral position, it being understood that the shift rail with which the finger is associated is likewise moved to neutral.

In order to remotely control the application of fluid pressure to and from the power-operated gear-changing apparatus, the manually-operable lever 10 is associated with a control valve mechanism 33, constructed as shown in the patent to Stephen Vorech No. 2,075,917, dated April 6, 1937, for Control mechanism. Such mechanism includes a plurality of valves housed within a casing, the latter having at its upper portion a pair of intersecting slots 34 and 35. Movement of lever 10 to the left, as viewed in Fig. 1, in slot 34 will effect operation of the valve controlling communication between conduits 25 and 36, the latter being connected through a suitable pressure-reducing valve 37 with the reservoir 31 by way of conduit 38. The aforementioned movement of the lever 10 serves to conduct fluid pressure to the shifting actuator 22 in order to effect second gear relation. Movement of the lever 10 to the other extremity of slot 34 serves to connect conduit 39 with the reservoir, fluid pressure being conducted through said conduit to conduit 26 by way of valve 40 which, when the transmission is neutralized, is normally open. This operation effects establishment of the third gear relation. On the other hand, movement of the lever 10 to the left in slot 35 establishes communication between conduit 20 and the reservoir and simultaneously charges a valve 41 and selector actuator 19 with fluid pressure. The valve 41 is opened as soon as sufficient movement of the actuator 19 takes place to select shift rail 12 through oscillation of finger 18, and thus fluid pressure is conducted to the shifter actuator by way of conduits 20 and 26. This operation establishes first gear ratio. In order to select and complete the reverse gear ratio, the lever 10 is moved to the opposite extremity of slot 35, after moving latch 42 to permit such movement, in order to connect conduit 21 with the reservoir. When conduit 21 is charged with fluid pressure, such pressure is simultaneously conducted to a valve 43 and to the actuator 19, the valve being opened to connect conduits 21 and 26 as soon as the actuator has moved sufficiently to effect engagement between the selector finger 18 and the shifter fork 17 attached to shift rail 14.

Means are provided for controlling the clutch-engaging and disengaging movements of clutch-controlling member 8 during changes in the transmission ratios and, preferably, such means are so constructed that the clutch is disengaged when the engine 6 is idling and is permitted to engage when the speed of the engine is gradually increased. As shown, such means include a centrifugally-controlled valvular mechanism 44 which is preferably constructed in accordance with the application of Roy S. Sanford, Serial No. 171,570, filed October 28, 1937, for Vehicle control mechanism. With the engine 6 idling, the valvular mechanism 44 serves to conduct fluid pressure from reservoir 31 to the clutch motor 11 by way of conduit 45, valve 46, conduit 47, valvular mechanism 44, conduit 48, valvular mechanism 49 and conduit 50. When the speed of the engine 6 is increased above idling speed, valvular mechanism 44 operates in such a manner as to exhaust the fluid from the clutch motor 11 through conduit 50, valvular mechanism 49, conduit 48 and an exhaust conduit 51, and the construction is such that the fluid pressure is gradually exhausted, thus permitting the vehicle clutch to be smoothly engaged through the action of the usual clutch return springs associated therewith, aided by a return spring 52 housed within the clutch motor 11.

Referring more particularly to Fig. 3, the centrifugally-operated valvular mechanism 44 includes a shaft 53 drivably connected at one end with the engine through a belt and pulley drive 54, the other end of the shaft having a rotor 55 secured thereto and provided with a plurality of centrifugally-actuated levers 56. The levers 56 include a weighted arm 57 and an actuating arm 58, the latter being adapted to cooperate with a bearing 59 which is capable of a limited sliding movement with respect to the rotor. The bearing 59 is adapted to pilot at one end a valve-actuating member 60, and the latter is maintained in a non-rotatable condition as by means of an extension 61 provided on a collar 62, the said extension embracing a stud 63 carried by a casing 64 of the valvular mechanism 44. From this construction, it will be readily perceived that, as the speed of rotor 55 increases, centrifugal force will effect a movement of levers 56 about pivot pins 55 in order to cause arms 58 to move bearing 59 and valve-actuating member 60 to the right, as viewed in Fig. 3. The latter member is normally urged toward the left, as viewed in this figure, through a spring 66 confined between a portion of the casing 64 and a diaphragm 67 secured to member 60 as by means of elements 68 and 69.

The valvular mechanism 44, in addition to the centrifugally-operated actuating device heretofore described, also includes a valve structure comprising a valve 70 provided with intake and exhaust heads 71 and 72 respectively, the intake head, when opened, serving to connect conduits 47 and 48 and the exhaust valve head 72, when opened, serving to connect conduits 48 and 51. This latter connection includes a plurality of ports 73 positioned in the member 60 and also includes the member 68 which is hollow and is adapted to form at its left-hand extremity a seat for the exhaust valve head 72. The valve 70 has associated therewith a spring 74 which constantly tends to seat the intake valve head.

Preferably, the parts of the centrifugally-operated valvular mechanism 44 are so initially adjusted that, with the engine idling, the spring 66 serves to move valve-actuating member 60 to the left in order to effect contact between member 68 and exhaust valve head 72 and lift the intake valve 71 off its seat. Under these conditions, fluid pressure will be conducted from conduit 47 to conduit 48 and, as heretofore described, the clutch motor 11 will be energized in order to effect disengagement of the vehicle clutch. When engagement of the clutch is desired, the engine speed is increased and the valve-actuating member 60 will be moved to the right, as viewed in Fig. 3, through the action of the centrifugally-operable weights 57. Thus the intake valve head 71 will be closed by means of spring 74 and member 68 will be moved away from the exhaust valve head 72 in order to gradually connect conduit 48 with the atmospheric exhaust conduit 51 through member 68 and ports 73. Thus the vehicle clutch may be smoothly engaged through the control of the engine speed.

The invention as disclosed in Fig. 1, in addition to embodying the structure heretofore described, which secures the highly desirable and advantageous results outlined, moreover is constituted in such a manner that, regardless of the speed of the engine and the operation of valvular mechanism 44, disengagement of the vehicle clutch is assured during each change of gear. To this end, the valvular mechanism 49 is provided, the said mechanism being associated with the piston rod 27 of the shifting actuator 22. As shown, such mechanism includes a casing 75 provided with inlet, outlet and exhaust chambers 76, 77 and 78 respectively, a valve 79 being housed within the casing and having an intake head 80 positioned within chamber 76 and an exhaust head 81 located within chamber 77. A valve-actuating member 82 is slidably mounted within the casing 75 and its upper portion is provided with a bore 83 functioning as an exhaust valve seat for head 81 and also serving to connect chamber 77 with chamber 78 and conduit 48 when the member 82 is moved out of contact with respect to head 81. The valve-actuating member 82 is operated by a suitable cam mechanism 84 carried by the piston rod 27, the cam mechanism being formed with a centrally-disposed cam groove 85, a pair of raised cam portions 86 and 87 disposed on either side thereof, and reduced portions 88 and 89 disposed adjacent cams 86 and 87 respectively. With such an arrangement, and with the transmission in the neutral position illustrated, a ball 90 in contact with the lower end of valve-actuating member 82 will be received within the cam groove 85, and thus exhaust valve head 81 will be open and conduits 50 and 48 will be connected through chamber 77, bore 83 and chamber 78. Thus fluid pressure will be conducted from the valvular mechanism 44 to the clutch motor 11 and the vehicle clutch will be disengaged with the transmission in neutral and the engine idling. Under such conditions, energization of the shift actuator 22 in such manner as to cause movement of piston rod 27 in either direction from neutral position, will, through cams 86 or 87, serve to move member 82 upwardly, as viewed in Fig. 1, in order to close exhaust valve 81 and open intake valve 80, such operation of these valves being effected prior to movement of the shifting finger 18 by reason of the provision of the lost motion connection 28. When intake valve 80 is opened, fluid pressure is conducted from the reservoir 31 to the clutch motor 11 by way of conduits 91 and 50, the intake valve head 80 serving to connect chambers 76 and 77 which are respectively connected with the conduits 91 and 50. After completion of gear-shifting movement of the piston rod 27, the cam portions 88 or 89 will be in contact with the cam ball 90 and the valvular mechanism 49 will be returned to the position shown on Fig. 1 where the centrifugally-controlled valvular mechanism 44 may control the application of fluid pressure to the clutch motor 11. Thus the valve mechanism 49 insures disengagement of the vehicle clutch prior to establishment of any gear relation irrespective of the centrifugally-controlled valvular mechanism 44 and hence disengagement of the clutch, during shifting of gears, is effected regardless of the speed of the engine.

In order to prevent the centrifugally-controlled valvular mechanism from supplying fluid pressure to the clutch motor when the vehicle transmission is operated to effect the establishment of certain gear ratios, means are provided for disconnecting the centrifugally-controlled valvular mechanism from the source of fluid pressure whenever a shift to such predetermined gear ratio is desired. Preferably, such means are so constituted that this disconnection of the source of fluid pressure from the valve mechanism is effected when shifting to second or third gear ratio. As shown, such means include a double-check valve 92 having a shiftable valve element 93 therein, the latter serving to connect a conduit 94 with either of the conduits 95 or 96 depending upon which of the latter conduits is energized with fluid pressure. The conduits 95 and 96 are respectively associated with the conduits 25 and 39 which control the selection and establishment of the second and third gear ratios. Conduit 94 is associated with valve 46 and the latter is constructed in such a manner that, when fluid pressure is conducted to conduit 94, the valve 46 will interrupt communication between conduits 45 and 47, thus disconnecting reservoir 31 from valvular mechanism 44.

Referring more particularly to Fig. 2, the valve 46 includes a casing 97 having a diaphragm 98 therein, the latter being normally urged, as by means of spring 99, into such a position that a member 100 carried by the diaphragm contacts and moves valve 101 downwardly in order to connect conduits 45 and 47. The casing 97 defines a diaphragm chamber 102 which is in constant communication with conduit 94 and so long as this latter conduit is not charged with fluid pressure, communication between conduits 45 and 47 will be maintained in the manner described. However, in the event fluid pressure is conducted to conduit 94 through energization of either of the second gear or third gear conduits 25 or 39, such fluid pressure within chamber 102 will move diaphragm 98 and member 100 upwardly, the valve 101 thereupon closing through the action of spring 103 and disconnecting the conduit 47 associated with the centrifugally-operable valvular mechanism from the reservoir 31. Hence, when the gear shift mechanism functions to establish the second or third gear ratio, the centrifugally-operable valve mechanism will be rendered inoperative to supply fluid pressure to the clutch motor 11. Thus, with the transmission in second or third gear ratio, there will be no danger of disengagement of the clutch should the engine speed decrease to that value which would place valvular mechanism 44 in a position to charge conduit 48 with fluid pressure. While the centrifugally-operable valve mechanism 44 is rendered inoperative in the manner above specified, when the transmission is shifted to establish the second or third gear ratio, it will be understood that the operation of the valve 49, during shifting movement of the piston rod 27 in effecting gear changes, efficiently controls the flow of fluid pressure to the clutch motor in order to cause clutch-disengaging movement of the latter.

While the valve 49 heretofore described serves to control the clutch-disengaging movement of the clutch motor 11 under certain conditions, it will be readily perceived that the association of valves 44 and 49 is such that the centrifugally-controlled valve controls the exhaust of fluid pressure from the motor 11 and thus the engagement of the vehicle clutch, irrespective of the gear ratio established by the transmission control mechanism. This will be readily understood when it is considered that conduit 48 connected with the centrifugally-controlled valve is always connected with conduit 50 associated with the clutch motor 11 whenever the valve 49 is in the position shown in Fig. 1 or in the position where the cam ball 90 engages the reduced cam portions 88 or 89. One or the other of the last named cam portions will be engaged when any gear ratio of the transmission is established. Thus, although, when second or third gear relation is established, the valve 49 serves to control the disengagement of the vehicle clutch, still, after establishment of the second or third gear relation, the exhaust of fluid from the clutch motor will be controlled by the centrifugally-operable valve mechanism. Hence the centrifugally-operable valve mechanism efficiently controls engagement of the clutch irrespective of the gear ratio established by the transmission control mechanism.

Referring more particularly to Fig. 4, the control mechanism illustrated therein is similar to that shown in Fig. 1 with the exception that a slightly different arrangement is employed for controlling the application of fluid pressure to the centrifugally-operable valve mechanism 44. Therein, the arrangement is such that no fluid pressure is applied to the valve 44 except when the gear-shifting mechanism is moved to a position to establish first or reverse gear ratios. As shown, a check valve 110 is connected to the reverse and first speed conduits 21 and 20 respectively as by means of conduits 111 and 112, the check valve including a pressure-responsive element 113 movable to connect either conduit 111 or conduit 112, depending upon which is energized, to a conduit 114 leading to the valve mechanism 44. With such an arrangement, when the transmission mechanism is in neutral position, the valve mechanism 44 will be disconnected from the fluid pressure supply and the clutch motor 11 will consequently not be energized. However, as soon as the controlling lever 10 is moved to select first or reverse gear relation, fluid pressure in conduits 20 or 21 will be conducted to the valve 44 by way of the double-check valve 110 and thus the clutch motor 11 will be energized through conduit 48, valve 49 and conduit 50 in the same manner as has heretofore been described in connection with Fig. 1. After first or reverse gear relation has been established, the operation of the vehicle clutch will be under the control of the centrifugally-operable valve mechanism, and, when the engine is rotating at idling speed, the clutch will be disengaged, while increase of engine speed will serve to permit engagement of the clutch. The construction and arrangement of the transmission control mechanism 9 and the valve 49 is the same as in Fig. 1, and it is moreover to be noted that, irrespective of the gear relation established by the transmission control mechanism, the clutch motor 11 will always be exhausted through the centrifugally-controlled valve mechanism 44 by way of valve 49. It will be further understood from this modification of the invention that, when second or third gear ratios are to be established, there will be no supply of fluid pressure to the valvular mechanism 44. Hence disengagement of the vehicle clutch under these conditions will be solely under the control of the valve 49, actuated during energization of the shifting actuator 22. Thus, when the transmission is established in second or third gear relation, the clutch will remain in engagement irrespective of decrease of speed of the engine to that point where the centrifugally-operable valve mechanism 44 would otherwise conduct fluid pressure to the clutch motor 11.

Figure 5:
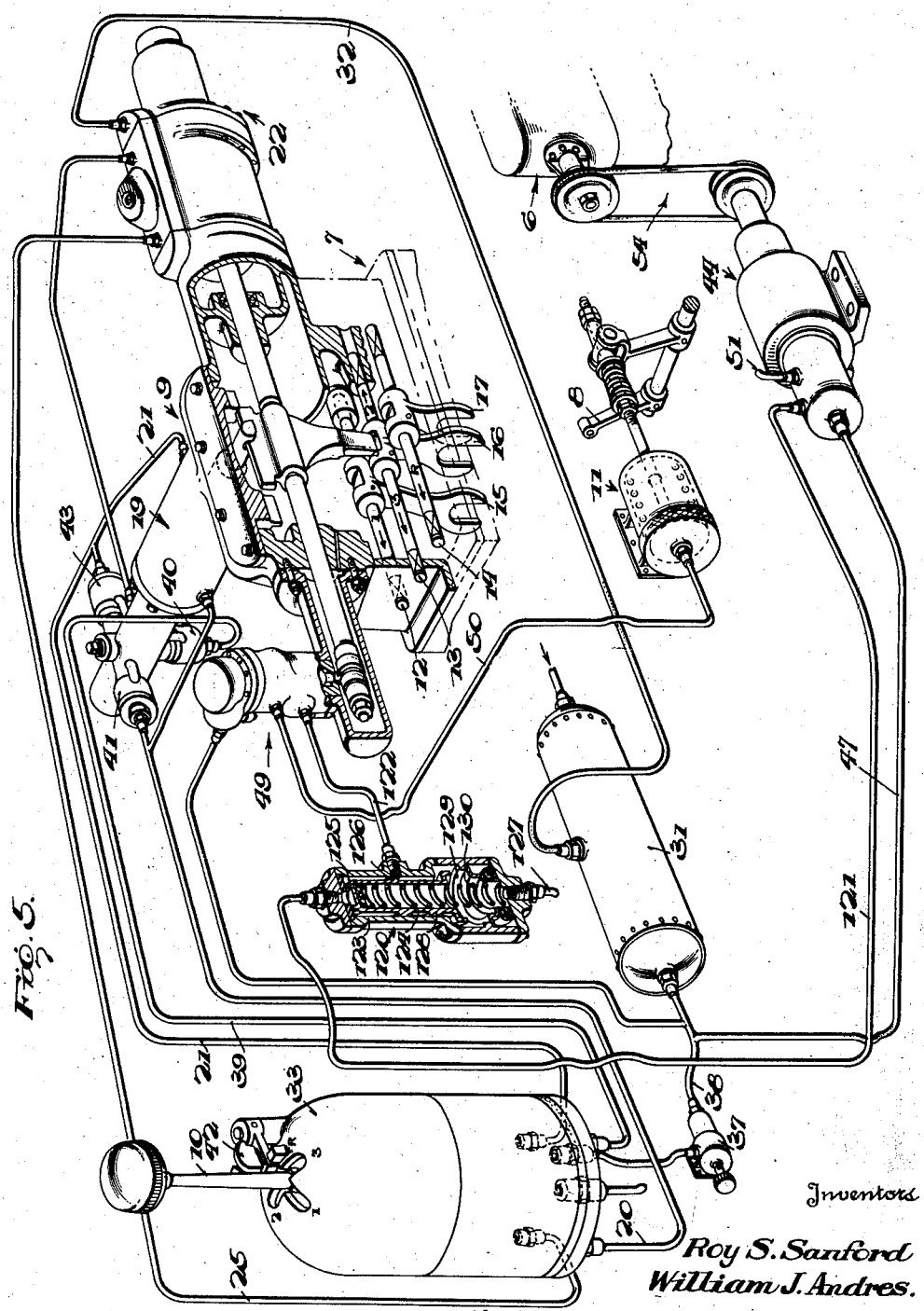
Fig. 5 is a diagrammatic view, partly in section, of still another modification of the vehicle-controlling mechanism.

Fig. 5 illustrates a further modification of the vehicle-controlling mechanism and is similar to that shown in Fig. 1 with the exception of the arrangement for controlling the application of fluid pressure to the valve 44 and the communication between the latter and valve 49. In the controlling mechanism of Fig. 5, the valve 44 is connected to the valve 49 through a valve device constructed as shown in the patent to Roy S. Sanford and William J. Andres, No. 2,128,165, entitled Vehicle control mechanism, dated August 23, 1938. Such valve device indicated at 120 is constructed in such a manner that a substantially high pressure is required to open the valve in order to connect conduits 121 and 122 for charging the clutch motor 11. Preferably, this pressure is sufficiently high to effect prompt disengaging movement of the clutch member 8. On the other hand, the valve device 120 will remain open in order to permit exhausting of fluid pressure from clutch motor 11 through the valve 44 by way of conduits 122 and 121 until such pressure is at a materially lower value than that required to open the valve.

As shown in Fig. 5, the valve device 120 includes a casing 123 housing a valve member 124, the latter being provided at its upper end portion with a skirt 125 of lesser diameter than the diameter of the valve member 124. The latter is provided with a cylindrical body portion 126 serving as a valve element and located in such a position with respect to conduit 122 that, with the parts in the position shown, the said conduit communicates with an exhaust passage 127. Such communication is enabled past guides 128 and into chamber 129 which is in constant communication with the exhaust passage 127. A spring 130 normally urges valve member 124 upwardly in order to maintain the latter in such position that the conduit 122 is exhausted to atmosphere and the skirt 125 abuts the top of the casing 123. The tension of such spring is also so regulated that, with the application of fluid pressure through conduit 121 to the head of member 124, the latter will be maintained closed until sufficient pressure is built up on that portion of the head defined by skirt 125 to overcome the tension of said spring. As soon as the pressure built up reaches this value, the valve element 124 will be snapped downwardly and maintained in such position due to the fact that the area of the head 124 then presented to the fluid pressure from conduit 121 will exceed the cross-sectional area of the head initially presented to such pressure. Under these conditions, fluid pressure from valve 124 will be conducted around the space between valve 124 and casing 123 to conduit 122 and thence to the clutch motor 11 by way of valve 49 and conduit 50.

Energization of the clutch motor will effect clutch-disengaging movement of the member 8 in the manner previously described. On the other hand, increase in speed of the engine will so operate the valve mechanism 44 as to gradually connect conduit 121 with the exhaust conduit 51. Fluid pressure from the clutch motor 11 will thereupon be conducted through conduit 50, valve 49 and conduit 122 to the valve device 120, and, since the entire area of valve element 124 will be subjected to the pressure of the fluid in conduit 122, the said valve element will remain open and permit fluid pressure to be communicated to conduit 121. It will also be understood that the fluid pressure in conduit 122 will fall considerably below that value which was necessary to initially open the valve device 120. When, however, the pressure of the fluid drops to such an extent that the spring 130 closes the valve element 124, the pressure of the fluid remaining in the clutch motor 11 will be substantially low and the clutch will be effectively engaged. Any remaining fluid pressure will be conducted past the guides 128 on valve element 124 to chamber 129 and thence to the atmosphere through connection 127. From this construction, it will be perceived that the clutch will be gradually engaged through the exhausting of fluid pressure from the clutch motor 11 through the centrifugally-controlled valvular mechanism 44, while premature disengagement and consequent slipping of the clutch at low vehicle speeds when second or third gear is engaged will be effectively prevented by the loading action of valve 120 due to the relatively high pressure required in conduit 121 for snapping the valve element 124 downwardly and establishing communication between conduits 121 and 122.

During operation of the form of the invention illustrated in Fig. 1, with the mechanism in the neutral position illustrated, and with the engine 6 idling, fluid pressure will be conducted to the clutch motor 11 from reservoir 31 by way of conduit 45, valve 46, conduit 47, valve 44, conduit 48, valve 49 and conduit 50. Increase in engine speed with the transmission in the neutral position will merely operate valve 44 in such manner as to exhaust the clutch motor 11 through conduit 50, valve 49, conduit 48, element 68, ports 73 and atmospheric connection 51. The clutch is thereupon engaged through the action of the spring 52 and the usual clutch return springs.

Should it be desired to shift into first gear, member 10 is moved to the left-hand extremity of slot 35 and the valve of the mechanism 35, operated during this movement, connects the reservoir 31 with conduit 20. The selector actuator 19 is thus charged in order to move finger 18 into engagement with shifter fork 15, and, as soon as this latter action has been effected, valve 41 opens to connect conduit 20 with the shifting actuator 22 through conduit 26. During initial movement of the piston 23 and piston rod 27 of the shifting actuator, valve 49 functions to connect the clutch motor 11 with the reservoir 31 by way of conduit 91, valve 49 and conduit 50. Operation of valve 49 is effected by engagement of cam 86 with cam ball 90 in the manner heretofore described. During the initial movement of the apparatus in shifting into first gear, it will thus be appreciated that fluid pressure is supplied the clutch motor independently of the centrifugally-operable valve 44. Thus disengagement of the clutch is assured irrespective of engine speed.

When first gear relation is established, the valve 49 returns to its normal position through engagement of the cam ball 90 with cam portion 88, and, since conduits 50 and 48 are then connected through the valve 49, the clutch may be gradually engaged by speeding up the engine and operating valve 44.

In establishing reverse gear relation, control member 10 is moved to the right-hand extremity of slot 35 in order to charge conduit 21 with fluid pressure. Such pressure will effect movement of the piston 23 to the left, as viewed in Fig. 1, after selection of the shifter fork 17, and the operation of valve 49, during initial movement of the piston, will charge the clutch motor with fluid pressure as in the case when shifting into first gear. Engagement of the clutch will likewise be controlled by operation of valve 44.

In shifting to second or third gear relations, however, movement of member 10 to either extremity of slot 34 will charge either conduit 25 or 39, thus supplying fluid pressure to the shifting actuator 22 to cause movement of the latter and shift rail 13 to the right or left, as viewed in Fig. 1. As soon as conduits 25 or 39 are charged with fluid pressure, the double-check valve 92 will function to conduct fluid pressure to the valve 46, thereby closing the latter. As a result of this action, communication between the centrifugally-controlled valve 44 and the reservoir 31 will be cut off and the fluid pressure supply to the clutch motor 11 will be solely under the control of the valve 49 actuated by movement of the gear shift mechanism. After establishment of the second or third gear relation, however, the exhaust of fluid pressure from the clutch motor will be controlled by the engine through operation of the valve 44. Hence the vehicle clutch may be gradually engaged in the same manner as heretofore described in connection with the shifting to first or reverse gear relation.

With regard to the operation of the modified form of the invention disclosed in Fig. 4 therein, the vehicle clutch will always be engaged when the transmission is in neutral. Although the clutch motor will be charged with fluid pressure to effect disengagement of the clutch each time the shifter actuator is moved from or toward neutral position, through operation of valve 49, still the centrifugally-controlled valve 44 will only be effective to supply fluid pressure to the clutch motor when the first or reverse speed conduits 20 or 21 are charged with fluid pressure. Thus the vehicle may be stopped with the transmission in first or reverse with the assurance that the clutch will be automatically disengaged by the action of the centrifugally-controlled valve.

In the operation of the form shown in Fig. 5, the clutch will always be disengaged when the transmission is in neutral, provided the engine is idling and thus maintains valve 44 in such position as to connect conduits 47 and 121. The provision of the snap-acting valve 120 between the centrifugally-controlled valve 44 and the clutch motor insures that no fluid will be conducted to the latter until the pressure thereof is sufficient to effect complete clutch disengagement. Such an arrangement avoids the possibility of a partial disengagement of the clutch while the vehicle is in gear and the speed of the engine is such as to partially operate valve 44 to admit a relatively low pressure to the conduit 121.

It is desired to point out that, in the drawings, the various parts of the systems disclosed have been illustrated in the positions they would occupy if no pressure were present in the fluid conduits, and the vehicle engine is at rest.

While several embodiments of the invention have been illustrated and described herein, it is to be understood that the same is not limited thereto but may be embodied in various forms, as will now be understood by those skilled in the art. Reference will, therefore, be had to the appended claims for a definition of the limits of the invention.

What is claimed is:

1. In combination with an automotive vehicle engine, a gear-changing mechanism including a plurality of members operable to establish different gear ratios, a clutch-controlling member, means including a fluid motor for controlling the clutch-disengaging and engaging movements of said last named member, valve means operable by said mechanism for controlling the energization of said motor, other valve means controlled by the speed of said engine for effecting energization of said motor, and means for rendering the last named valve means inoperative to energize the fluid motor, irrespective of engine speed, when the said mechanism is operated to establish a predetermined gear ratio.

2. In combination with an automotive vehicle engine, a gear-changing mechanism, a clutch-actuating member, means including a fluid motor for controlling the movements of said member, means for varying the fluid pressure in said motor in order to effect and control the clutch-disengaging and engaging movements of said member, said means including a pair of valves, one operated by said mechanism, and the other controlled by the speed of the engine, and means for interconnecting said valves in such manner that the fluid pressure in said motor is exhausted from the speed-responsive valve through the mechanism-operated valve to control the clutch-engaging movement of said member and irrespective of the gear ratio established by said mechanism.

3. In combination with an automotive vehicle engine, a gear-changing mechanism, a clutch-actuating member, means including a fluid motor for controlling the movements of said member, means for varying the fluid pressure in said motor in order to effect and control the clutch-disengaging and engaging movements of said member, said means including a pair of valves, means associated with the engine for operating one of the valves in accordance with variations in engine speed, means controlled by said mechanism for operating the other of said valves to supply fluid pressure to said motor independently of said one valve, and means for interconnecting said valves in such manner that the fluid pressure from said motor will be exhausted through said one valve by way of said other valve.

4. In combination with an automotive vehicle engine, a gear-changing mechanism, a clutch-actuating member, means including a fluid motor for controlling the movements of said member, means including a centrifugally-controlled valve means for supplying fluid pressure to said motor when the mechanism is in one predetermined gear-engaged position, and means dependent upon operation of said mechanism to effect another predetermined gear-engaged position and irrespective of engine speed for rendering said centrifugally-controlled valve means inoperative to supply fluid pressure to the motor.

5. In combination with an automotive vehicle engine, a gear-changing mechanism, a clutch-actuating member, means including a fluid motor for controlling the movements of said member, means including a centrifugally-controlled valve means for connecting said motor with a source of fluid pressure when the mechanism is in one predetermined position, and means dependent upon operation of the mechanism to another predetermined position for disconnecting the centrifugally-controlled valve means from the source.

6. In combination with an automotive vehicle engine, a gear-changing mechanism, a clutch-actuating member, means including a fluid motor for controlling the movements of said member, means including a centrifugally-controlled valve means for connecting said motor with a source of fluid pressure when the mechanism is in one predetermined position, and means dependent upon operation of said mechanism to a predetermined gear-engaged position for rendering said centrifugally-controlled valve means inoperative to connect the motor with said source of fluid pressure.

7. In combination with an automotive vehicle engine, a gear-changing mechanism, a clutch-actuating member, means including a fluid motor for controlling the movements of said member, means including a centrifugally-controlled valve means for controlling the flow of fluid pressure to and from the motor, valve means actuated by the mechanism for controlling the flow of fluid pressure to and from the motor, and means for rendering the centrifugally-controlled valve means inoperative to control the flow of fluid pressure to the motor when the mechanism is moved to a predetermined gear-engaged position.

8. In combination with an automotive vehicle engine, a gear-changing mechanism, a clutch-actuating member, means including a fluid motor for controlling the movements of said member, means including a centrifugally-controlled valve means for connecting said motor with a source of fluid pressure, valve means actuated by said mechanism for connecting the motor with the source, and means actuated by the movement of the mechanism to a predetermined position for disconnecting the centrifugally-controlled valve means from said source.

9. In combination with an automotive vehicle engine, a gear-changing mechanism, a clutch-actuating member, means including a fluid motor for controlling the movements of said member, means including a centrifugally-controlled valve means for connecting said motor with a source of fluid pressure, valve means actuated by said mechanism for connecting the motor with the source, and fluid pressure means actuated by the movement of the mechanism to a predetermined position for disconnecting the centrifugally-controlled valve means from said source.

10. In combination with an automotive vehicle engine, a gear-changing mechanism, a clutch-actuating member, means including a fluid motor for controlling the movements of said member, valve means operable during operation of said mechanism in effecting all changes of gear to supply fluid pressure to said motor to cause clutch-disengaging movement of said member, other valve means responsive to the speed of the engine for supplying fluid pressure to the motor, and means operable during predetermined changes of gear for rendering the last named valve means inoperative to supply fluid pressure to the motor, said last named means maintaining said last named valve means inoperative after completion of said predetermined gear changes.

11. In combination with an automotive vehicle engine, a gear-changing mechanism, a clutch-actuating member, means including a fluid motor for controlling the movements of said member, means for varying the fluid pressure in said motor in order to effect and control the clutch-disengaging and engaging movements of said member, said means including a centrifugally-controlled valve means, a source of fluid under pressure, a pressure-responsive valve for connecting said source and valve means, and means operable when the mechanism is moved to a predetermined position for closing said valve and interrupting communication between the source and valve means.

12. In combination with an automotive vehicle engine, a gear-changing mechanism, a clutch-actuating member, means including a fluid motor for controlling the movements of said member, means for varying the fluid pressure in said motor in order to effect and control the clutch-disengaging and engaging movements of said member, said means including a centrifugally-controlled valve means, a source of fluid under pressure, a pressure-responsive valve for connecting said source and valve means, other valve means controlled by movement of said mechanism in effecting all gear changes to connect said motor and source, and means operable when the mechanism is moved to a predetermined position for closing said valve and interrupting communication between the source and centrifugally-controlled valve means.

13. In combination with an automotive vehicle engine, a gear-changing mechanism including a manually-operable element movable to selectively establish first, second, third or reverse gear ratios, a clutch-controlling member, means including a fluid motor for controlling the clutch-disengaging and engaging movements of said member, valve means operable in accordance with variations in the speed of said engine, means connecting said valve means with said motor, a source of fluid pressure, means connecting said valve means and source, and means for rendering said last named connecting means inoperative to connect the valve means and source when said element is moved to establish second or third gear ratios.

14. In an automotive vehicle having an engine, a clutch-controlling member, and a transmission of the type having an element movable to select and shiftable to establish a desired gear relation, a fluid motor for controlling disengaging and engaging movements of said clutch member, valve means responsive to the speed of the engine for controlling the flow of fluid to and from said motor, a fluid actuator for moving said element, a second fluid actuator for shifting said element, other valve means operable by said second fluid actuator for controlling the flow of fluid to and from said motor, and means for connecting said two valve means whereby fluid from said motor is conducted to said first named valve means through said second named valve means.

15. In an automotive vehicle having an engine, a clutch-controlling member, and a transmission of the type having an element movable to select and shiftable to establish a desired gear relation, a fluid motor for controlling disengaging and engaging movements of said clutch member, valve means responsive to the speed of the engine for controlling the flow of fluid to and from said motor, a fluid actuator for moving said element, a second fluid actuator for shifting said element, means including a plurality of conduits for conveying fluid to said actuators to operate the latter to select and establish a desired gear relation, a manually-operable member for controlling said conduits, and means responsive to fluid flow through certain of said conduits, for rendering said valve means inoperative to control the flow of fluid to said motor.

16. In an automotive vehicle having an engine, a clutch-controlling member, and a transmission of the type having fluid-operated means associated therewith for selecting and establishing a desired gear relation, a fluid motor operatively connected with said member, valve means responsive to the speed of the engine for controlling the flow of fluid to and from the motor, a source of fluid, a valve for connecting said source and valve means, means including a plurality of conduits for connecting said source and fluid-operated means, and means controlled by the pressure of the fluid in certain of said conduits for closing said valve and interrupting communication between said valve means and the source.

17. In an automotive vehicle having an engine, a clutch-controlling member, and a transmission of the type having fluid-operated means associated therewith for selecting and establishing first, second, third or reverse gear relation, a fluid motor operatively connected with said member, valve means responsive to the speed of the engine for controlling the flow of fluid to and from the motor, a source of fluid, a valve for connecting said source and valve means, a plurality of conduits for connecting said source and fluid-operated means, a plurality of valves associated with said conduits, a manually-operable element for selectively operating said valves, and means actuated by the pressure of the fluid in the conduits controlling the selection and establishment of second and third gear relations for closing said valve and interrupting communication between said valve means and source.

18. In an automotive vehicle having an engine, a clutch-controlling member, and a transmission of the type having fluid-operated means associated therewith for selecting and establishing first, second, third or reverse gear relation, a fluid motor operatively connected with said member, valve means responsive to the speed of the engine for controlling the flow of fluid to and from the motor, a source of fluid, a plurality of conduits for connecting said source and fluid-operated means, a plurality of valves associated with said conduits, a manually-operable element for selectively operating said valves, and means actuated by the pressure of the fluid in the conduits controlling the selection and establishment of second and third gear relations for rendering said valve means inoperative to supply fluid to said motor.

19. In an automotive vehicle having an engine, a clutch-controlling member, and a transmission of the type having fluid-operated means associated therewith for selecting and establishing first, second, third or reverse gear relation, a fluid motor operatively connected with said member, valve means responsive to the speed of the engine for controlling the flow of fluid to and from the motor, a source of fluid, a valve for connecting said source and valve means, other valve means actuated by said fluid-operated means for controlling the flow of fluid to and from said motor, means including a plurality of conduits for connecting said source and fluid-operated means, and means actuated by fluid pressure in the conduits controlling the selection and establishment of second and third gear relations for closing said valve and interrupting communication between said first named valve means and source.

20. In an automotive vehicle having an engine, a clutch-controlling member, and a transmission of the type having fluid-operated means associated therewith for selecting and establishing a desired gear relation, a fluid motor operatively connected with said member, valve means responsive to the speed of the engine for controlling the flow of fluid to and from the motor, a source of fluid, a valve for connecting said source and valve means, means including a plurality of conduits for connecting said source and fluid-operated means, and means controlled by the pressure of the fluid in certain of said conduits for closing said valve and interrupting communication between said valve means and the source, said last named means including a double-check valve connected to two of said conduits.

21. In combination with an automotive vehicle engine, a gear-changing mechanism including a manually-operable element movable to selectively establish first, second, third or reverse gear ratios, a clutch-controlling member, means including a fluid motor for controlling the clutch-disengaging and engaging movements of said member, valve means operable in accordance with variations in the speed of said engine, means connecting said valve means with said motor, a source of fluid pressure, and means actuated during operation of said element in establishing first and reverse gear ratios for connecting said valve means and source.

22. In an automotive vehicle having an engine, a clutch-controlling member, and a transmission of the type having fluid-operated means associated therewith for selecting and establishing a desired gear relation, control mechanism for said means, a fluid motor operatively connected with said member, valve means responsive to the speed of the engine, means connecting said valve means and motor, a source of fluid pressure, and means controlled by said control mechanism for connecting said valve means and source.

23. In an automotive vehicle having an engine, a clutch-controlling member, and a transmission of the type having fluid-operated means associated therewith for selecting and establishing a desired gear relation, a fluid motor operatively connected with said member, valve means responsive to the speed of the engine, other valve means controlled by said fluid-operated means for controlling the flow of fluid to and from the motor, and means connecting said first and second named valve means including a valve device constructed and arranged to establish communication between the first and second named valve means at a predetermined pressure and to interrupt communication at a different predetermined pressure.

24. In an automotive vehicle having an engine, a clutch-controlling member, and a transmission of the type having means for selecting and establishing a desired gear ratio, a fluid motor operatively connected with said member, valve means responsive to the speed of the engine, other valve means controlled by said first means for controlling the flow of fluid to and from said motor, and means connecting said first and second named valve means including a valve device constructed and arranged to establish communication between the first and second named valve means at a predetermined pressure and to interrupt communication at a different predetermined pressure.

25. In an automotive vehicle having an engine, a clutch-controlling member, and a transmission of the type having means for selecting and establishing a desired gear ratio, a fluid motor operatively connected with said member, valve means responsive to the speed of the engine, other valve means for controlling the flow of fluid to and from said motor, and means for connecting said first and second named valve means and motor including a valve device constructed and arranged to establish communication between the first named valve means and the motor at a predetermined pressure and to interrupt communication at a different predetermined pressure.

26. In an automotive vehicle having an engine and a clutch-controlling member, a fluid motor operatively connected with said member, valve means responsive to the speed of the engine for controlling the flow of fluid to and from said motor, and means connecting said valve means and motor including a valve device responsive to the pressure delivered by the valve means for establishing communication between said valve means and motor at a predetermined pressure and for interrupting communication therebetween at a different predetermined pressure.

27. In an automotive vehicle having an engine, a controlling member, and transmission of the type having an element movable in opposite directions from a neutral position to control the establishment of one or the other of a pair of gear ratios, a fluid motor operatively connected with said member, and means for controlling the energization of said motor comprising a source of energy and a circuit connected thereto and having a pair of devices arranged in series therein, one of said devices being responsive to the speed of the engine and the other device being actuated by movement of said element to neutral position.

28. In an automotive vehicle having an engine, a gear ratio-changing transmission and mechanism for connecting the engine and transmission including a controllable element, fluid operated power means for shifting said transmission from neutral to a desired gear relation and from the latter position to neutral, said power means including a piston having a piston rod operatively associated with the transmission, a fluid motor operatively connected with said controllable element, and means operable when the speed of the engine is reduced to a predetermined minimum and said power means is operated to shift the transmission to neutral for controlling the energization of said motor comprising a device controlled by engine speed and a second device associated with the transmission, and a cam mechanism movable by said piston rod when the power means returns the transmission to neutral for operating said second device.

29. In an automotive vehicle having an engine, a gear ratio-changing transmission and mechanism for connecting the engine and transmission including a controllable element, fluid operated power means for shifting said transmission from neutral to a desired gear relation and from the latter position to neutral, said power means including a piston having a piston rod operatively associated with the transmission, a fluid motor operatively connected with said controllable element, and means for controlling the energization of said motor including a source of energy and a circuit connected thereto and having a pair of devices arranged in series therein, means responsive to engine speed for controlling one device, and cam mechanism movable by said piston rod for operating the other device.

30. In combination with an automotive vehicle engine, a gear-changing mechanism, a vehicle controlling element, means including a fluid motor for controlling the movements of said element, means including a device responsive to engine speed for energizing said motor when the mechanism is in one predetermined gear-engaged position, and means dependent upon operation of said mechanism to effect another predetermined gear-engaged position and irrespective of engine speed for rendering said device inoperative to energize said motor.

31. In an automatic clutch system for a motor vehicle including a transmission having a starting range and a driving range, means for adjusting the transmission to operate in either of said ranges, a clutch, a fluid motor for exercising a controlling effect on the clutch, means for supplying fluid under pressure to said motor, speed-responsive means for controlling automatic operation of the motor and thereby of the clutch, and fluid-operated lock-in mechanism, operative, when the transmission is adjusted to the driving range, to cause the clutch to become locked in engagement irrespective of speed.

32. In an automotive vehicle including a transmission shifting element and a fluid operated clutch, centrifugal governor means for controlling the pressure of the fluid in said clutch and thereby controlling the engagement and disengagement of the clutch automatically in response to changes in rotational speed of a member of said clutch, and means for rendering said governor inoperative so as to lock said clutch in engagement irrespective of rotational speed, said last means including a valve controlled by shifting movement of said transmission shifting element.

33. In an automotive vehicle including a transmission shifting element and a fluid operated clutch, centrifugal governor means for controlling the pressure of the fluid in said clutch and thereby controlling the engagement and disengagement of the clutch automatically in response to changes in rotational speed of a member of said clutch, and means for rendering said governor inoperative so as to lock said clutch in engagement irrespective of rotational speed, when the transmission is adjusted to a driving range said last means including a valve controlled by shifting movement of said transmission shifting element.

ROY S. SANFORD.
WILLIAM J. ANDRES.